Oct. 25, 1927.

H. J. TOEPFERT 1,646,798

ENVELOPE LINER MACHINE AND METHOD

Filed Jan. 12, 1927   12 Sheets-Sheet 4

INVENTOR
Henry J. Toepfert
BY
his ATTORNEY

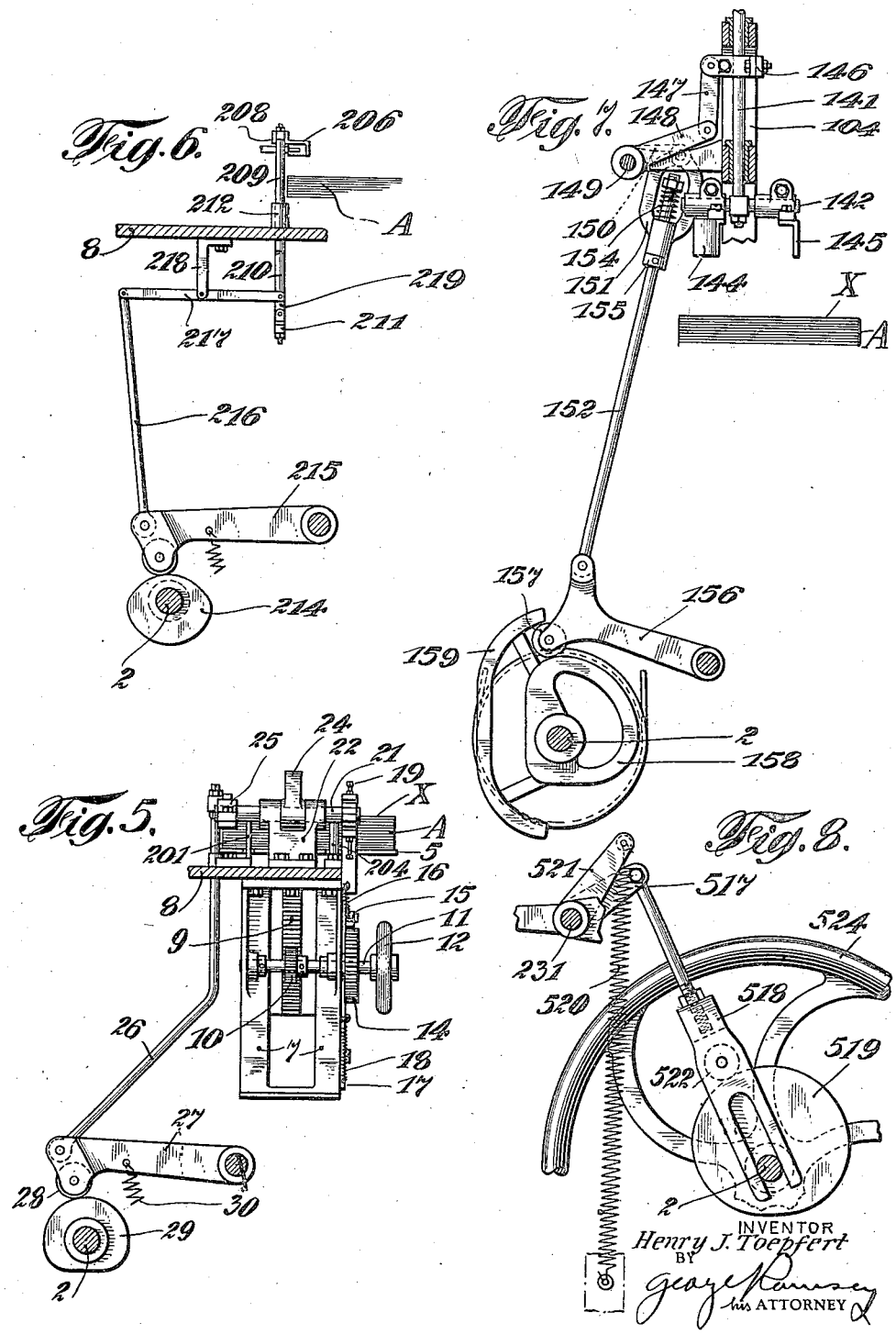

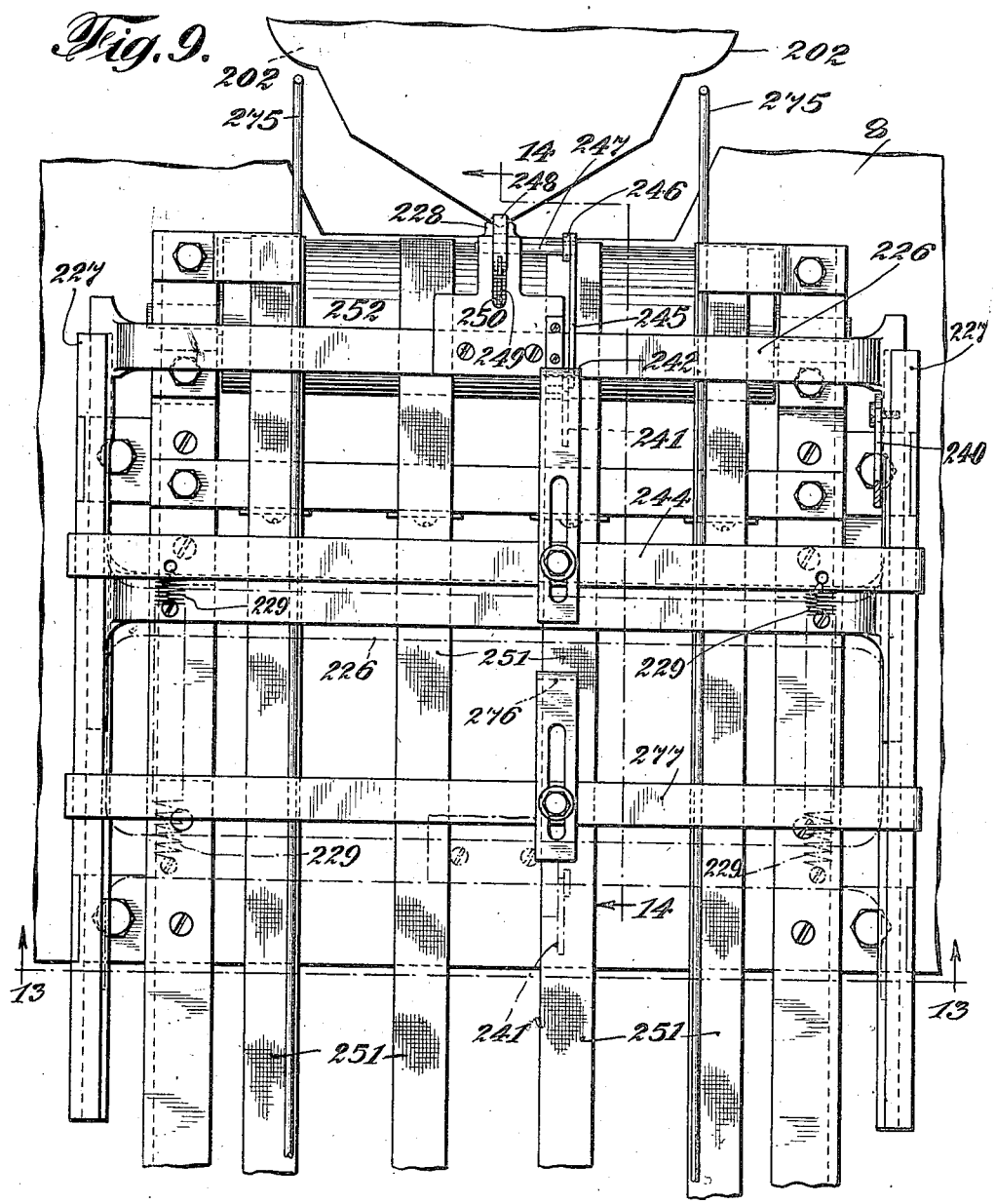

Oct. 25, 1927.

H. J. TOEPFERT 1,646,798

ENVELOPE LINER MACHINE AND METHOD

Filed Jan. 12, 1927   12 Sheets-Sheet 7

INVENTOR
Henry J. Toepfert
BY
his ATTORNEY

Oct. 25, 1927.

H. J. TOEPFERT 1,646,798

ENVELOPE LINER MACHINE AND METHOD

Filed Jan. 12, 1927　　　12 Sheets-Sheet 8

INVENTOR
Henry J. Toepfert
BY
George Ramsey
his ATTORNEY

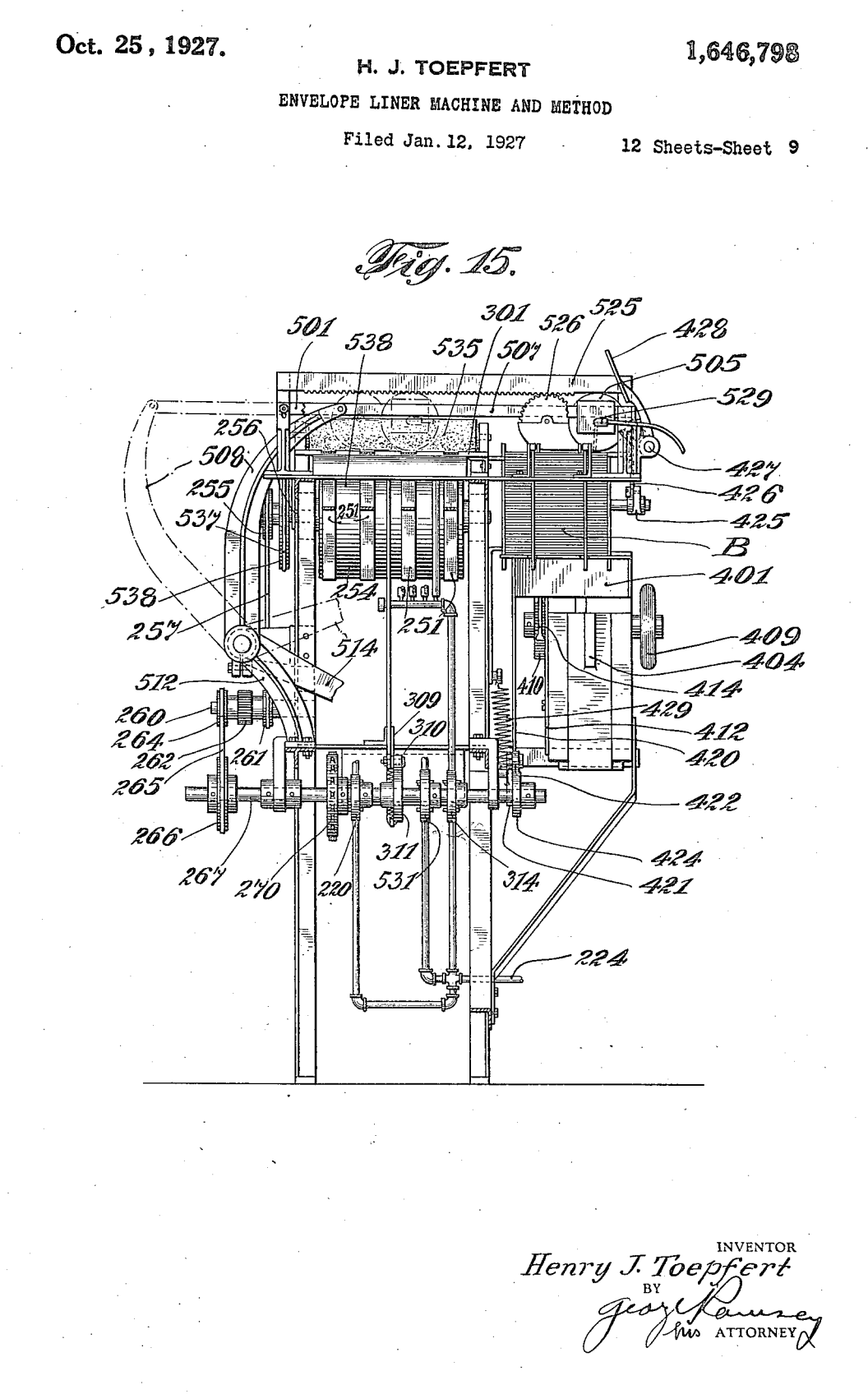

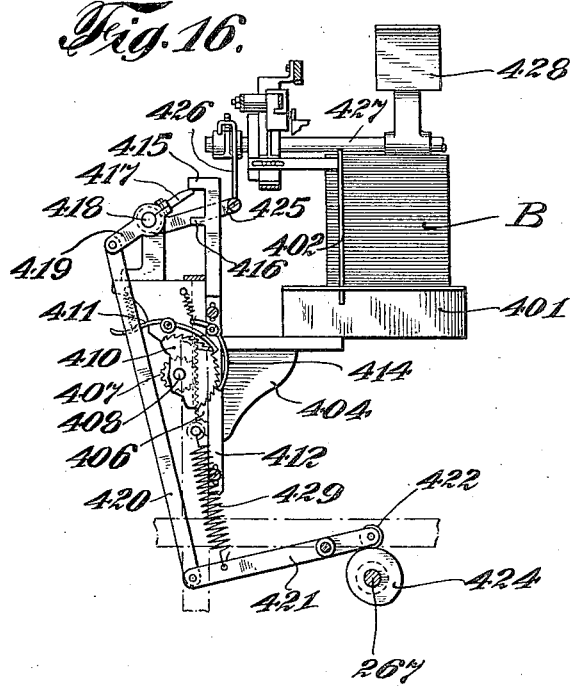
Fig. 16.
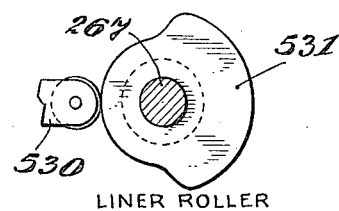
Fig. 17. LINER ROLLER
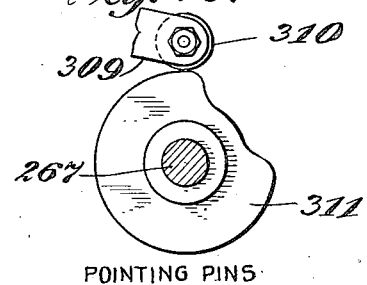
Fig. 20. POINTING PINS
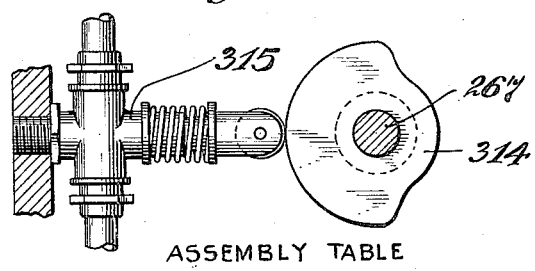
Fig. 19. ASSEMBLY TABLE
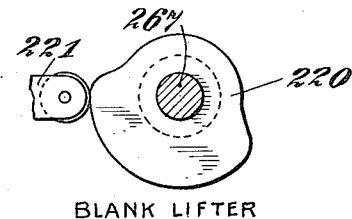
Fig. 18. BLANK LIFTER

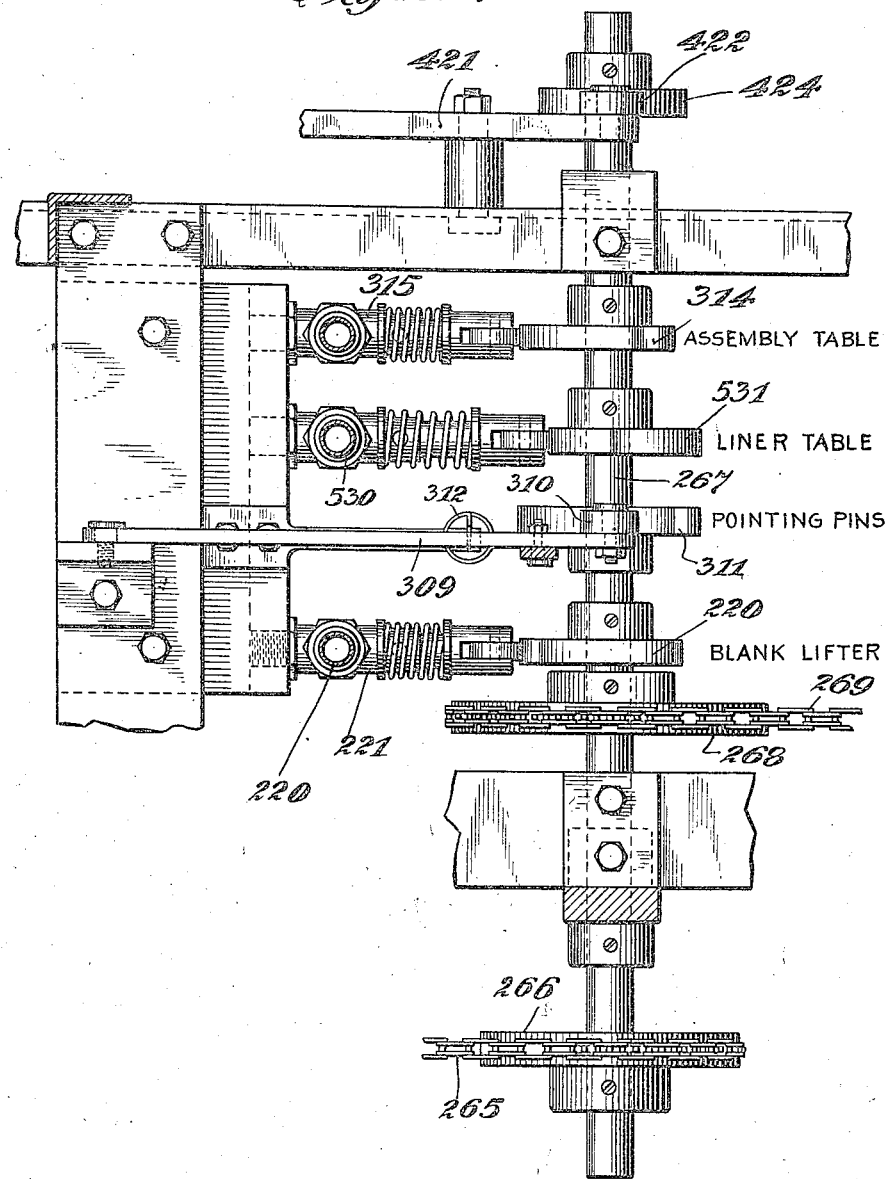

Oct. 25, 1927.
H. J. TOEPFERT
1,646,798
ENVELOPE LINER MACHINE AND METHOD
Filed Jan. 12, 1927     12 Sheets-Sheet 12
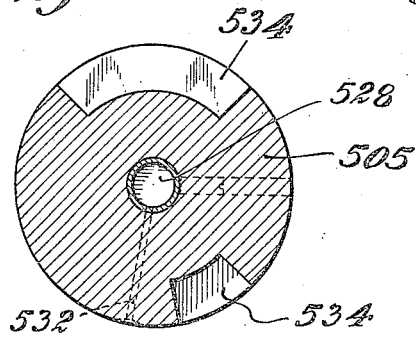
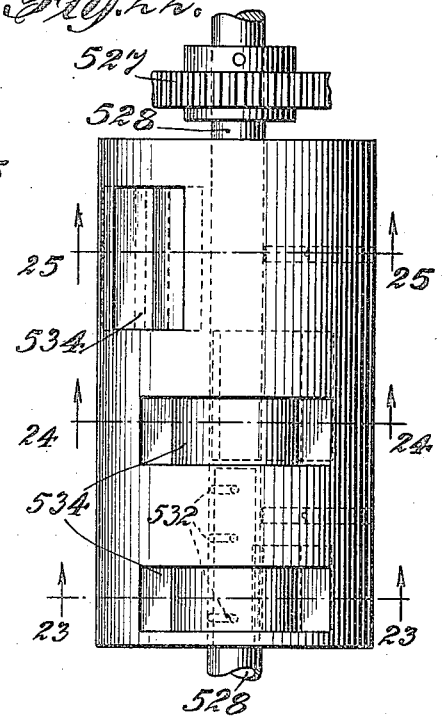
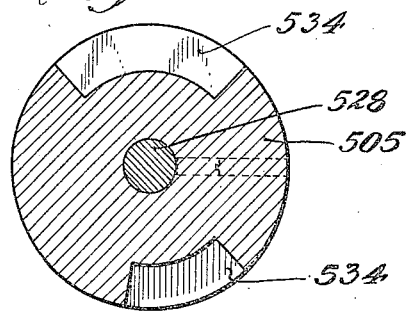
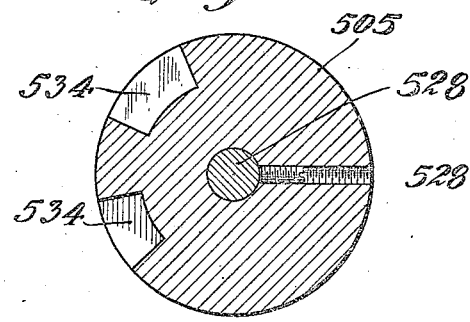
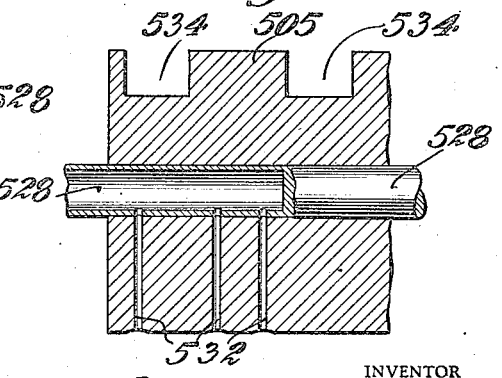
INVENTOR
Henry J. Toepfert
BY
his ATTORNEY Patented Oct. 25, 1927.

1,646,798

UNITED STATES PATENT OFFICE.

HENRY JOSEPH TOEPFERT, OF HOLYOKE, MASSACHUSETTS, ASSIGNOR TO WHITE AND WYCKOFF MANUFACTURING COMPANY, OF HOLYOKE, MASSACHUSETTS, A CORPORATION OF MASSACHUSETTS.

ENVELOPE-LINER MACHINE AND METHOD.

Application filed January 12, 1927. Serial No. 160,552.

The present invention relates broadly to paper fabricating mechanism and more especially to a machine for attaching liners to envelope blanks.

The machine comprises essentially the following groups of mechanism; means to apply mucilage or cement to attach the liner and envelope blank together when the liner is accurately positioned over the blank; mechanism to feed individual envelope blanks to an assembly station; a device to feed an individual liner for each envelope blank and register the liner upon the blank; pressure applying mechanism to squeeze the blank and liner together to facilitate cementing the one to the other as a unitary member.

Heretofore in the art, liners for envelopes have been applied by manual labor without the use of automatic machinery. The customary way of performing this operation was to apply mucilage to one edge of the liner and a spot of mucilage to some other portion of the liner, then to manually place the liner on a blank and manually apply pressure by a rubbing operation or otherwise on the liner to attach the liner to the blank. This operation necessarily was slow and the quality of the work depended entirely upon the skill of the operator. The liners were not accurately placed upon the blanks and the final result was not very satisfactory. If the operator used too much or too little mucilage, the result again was unsatisfactory. The elements of skill were such that a relatively long period of training was required to develop operators whose work would pass inspection. Furthermore, the use of manual labor in this operation greatly added to the cost of the finished lined envelope.

The present invention is embodied in an automatic machine for applying the liners to envelope blanks so that the results are accurate and precise, and wherein the operations are entirely performed without necessity of human intervention except to supply the machine with the necessary materials, and to keep the machine in proper running order.

A general outline of the machine comprising an embodiment of the present invention is as follows:

Devices are provided at one end of a main frame to support a stack of inverted envelope blanks with the topmost blank of the stack maintained at substantially a predetermined elevation. This is effected by mechanism controlled by a feeler finger which touches the topmost blank after each cycle of operations and regulates support raising devices to raise the stack in accordance with the diminution of the blanks carried upon the blank supporting shelf.

A cement applying mechanism comprising an applicator is mounted directly over the stack of envelope blanks. Cement carrying doctor rolls have a reciprocatory movement above the blanks and in contact with the lower faces of the applicator. At one end of the travel of the doctor rolls, they come in contact with a pick-up roll running in a bath of cement so that a film thereof is transferred to the doctor rolls. As the doctor rolls move away from the pick-up roll, they contact with the applicator and transfer cement to the faces thereof, so that when the applicator descends into contact with the topmost blank, an imprint of cement is left on the blank over predetermined areas to which a liner is to be cemented. As the applicator descends, a suction member also is brought down into engagement with the leading edge portion of the blank. As the applicator rises, the suction member follows it and the leading edge of the blank is raised. At this moment, a blast of air is directed beneath the leading edge of the lifted blank and the stack of blanks so that the lifted blank substantially floats free from the stack. The applicator continues to rise and is entirely freed from the blank. A mechanical gripper now comes forward and catches the leading point or edge of the blank. Suction is released from the suction lift and the blank is drawn by the gripper on to traveling tapes where it is dropped to be carried forward by the tapes. The tapes carry the blank along until the shoulders of the blank encounter positioning pins on an assembly table. These pins accurately position the blank on the assembly table and restrain the light friction of the tapes from carrying the blank forward. After the blank is positioned upon the assembly table, suction is rendered effective through suitable openings in this table to securely clamp the envelope blank to the table.

A stack of face up liners is supported at the side of the machine opposite the assembly table and this stack likewise is raised by suitable mechanism as the liners are taken from the top of the stack. A liner carrier roller provided with suction openings is mounted on a carriage adapted to reciprocate upon rails extending cross-wise of the machine over the stack of liners and the assembly table. This liner carrier roller is arranged to rotate during the reciprocatory motion of this carriage across the machine. As the carriage moves over the stack of liners, the liner carrier roller has been rotated in such manner as to bring the suction openings therein directly over and in contact with the far edge of the topmost liner on the stack. Suction is now effective to cause the far edge of the liner to be drawn against the liner carrier roller. As the carriage is moved from over the stack of liners toward and over the assembly table, the liner being held by its edge, is wrapped around and carried by the roller which is so timed and adjusted in its movement as to carry the liner exactly over the cement coated portion of the blank, being held on the assembly table, and as the suction held edge of the liner comes into contact with the cement on the blank, suction is released from the liner carrier roller and the liner drops free upon the blank where it is pressed against the cement by the liner carrier roller. This roller proceeds in its travel beyond the assembly table so that the blank with the liner thereon is again being held only by the positioning pins and suction effective at the assembly table. The positioning pins drop and suction effective through the assembly table is released. The friction between the traveling tapes and the blank is now sufficient to quickly carry the blank with the liner thereon from the assembly table and to direct the leading edge of the blank to a pair of squeegee rolls through which the assembled blank and liner pass. The axis of these rolls is at right angles to the axis of the liner carrier roller and they apply the final pressure which tightly squeezes the liner and blank together and causes the cement to be sufficiently impregnated into the fibers of the paper to produce a tight adherence of the liner to the blank so that the united parts may be treated as a unit when fabricating an envelope therefrom.

Realizing that the invention herein disclosed may be practiced in constructions other than those specifically shown and described, I desire that the disclosure shall be considered as illustrative and not in the limiting sense.

The drawings illustrate a preferred form of the invention and throughout the several figures thereof like characters are used to represent like parts.

Fig. 5 is a detail view illustrating the mechanism for raising the envelope blank carrying table and for maintaining the topmost blank at a predetermined level.

Fig. 6 illustrates the cam and connected mechanism for operating the pneumatic lift for the forward edge of the topmost blank.

Fig. 7 is a detail of the cam operating mechanism for raising and lowering the applicator to apply cement to the topmost envelope blank.

Fig. 8 illustrates the cam for operating the cross carriage for the liner carrier roll which carries the liners to the assembly table.

Fig. 9 is a detail plan view of the gripper carriage for pulling a blank on to the traveling tapes to carry the same through the machine.

Fig. 15 is a cross sectional view through the machine taken on line 15—15 of Fig. 1.

Fig. 16 is taken on line 16—16 of Fig. 1, and is a detail view illustrating the liner stack support and mechanism for maintaining the top liner at a predetermined level.

Fig. 17 illustrates the cam for controlling the suction applicable upon the liner carrier roller.

Fig. 18 illustrates the cam for controlling suction upon the envelope blank lifter.

Fig. 19 illustrates the cam and valve for controlling suction effective at the assembly table to hold an envelope blank during the lining applying operation.

Fig. 20 illustrates the cam for raising and lowering the positioning pins to stop the envelope blank over the assembly table.

Fig. 21 illustrates the cam shaft for the cams shown in Figs. 17, 18, 19, and 20.

Fig. 22 is a plan view of the liner carrying roller.

Fig. 23 is a section on line 23—23 of Fig. 22.

Fig. 24 is a section on line 24—24 of Fig. 22.

Fig. 25 is a section on line 25—25 of Fig. 22.

Fig. 26 is a longitudinal section through a portion of one end of the liner carrier roller illustrating the holes through which suction is effective on the edge of a liner.

Power is applied to the machine (Fig. 1) through the belt wheel 1 which is loosely mounted on the main shaft 2 and adapted to be operatively connected therewith by the manually controlled clutch 4, having a driven member secured to shaft 2. The power delivered to the main shaft is distributed therefrom to operate the several groups of mechanism to assemble the blanks and liners.

Envelope blank stack support.

Figure 3:
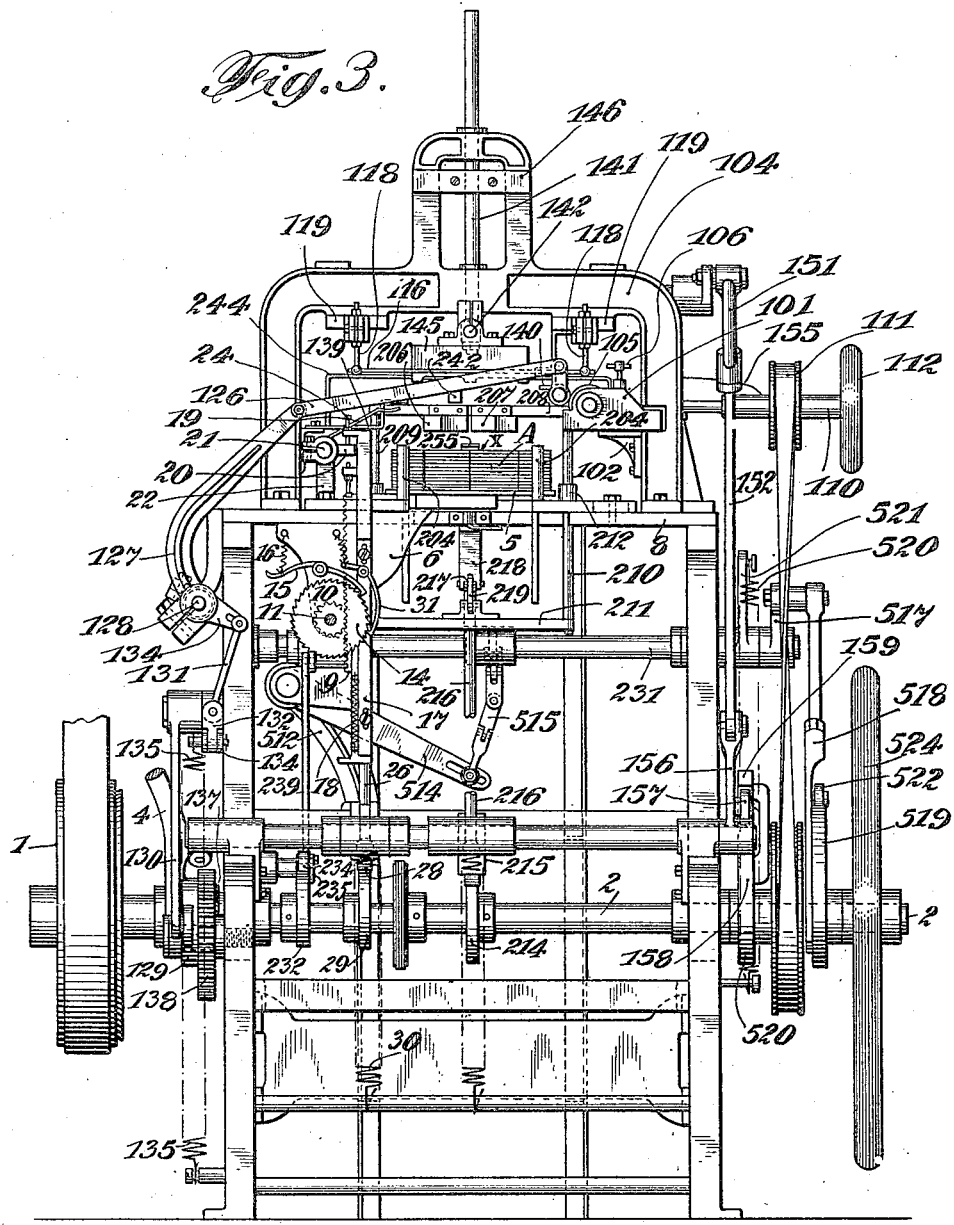
Fig. 3 is a front end elevation of the machine where the envelope blanks are fed into the machine.
Figure 4:
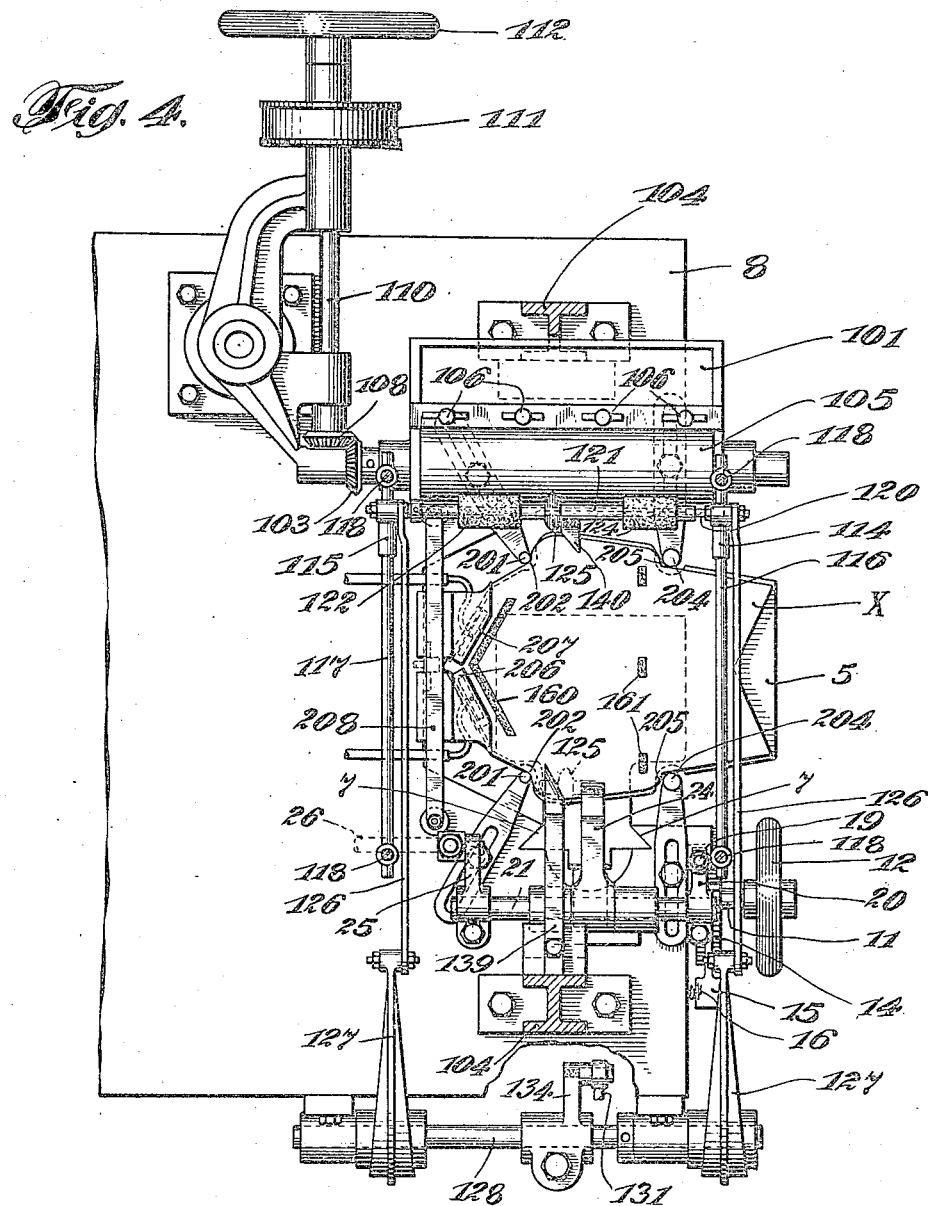
Fig. 4 is a plan view illustrating a portion of the envelope feeding mechanism and showing a part of the mechanism for applying cement to the topmost envelope blank.

Referring more especially to Figs. 1 to 5 inclusive:

The stack of inverted envelope blanks A rests upon a shelf 5 carried by a bracket 6 that is vertically slidable upon guideways 7 mounted on one side of the bed plate 8. A rack 9 (Fig. 5) is attached to the bracket 6 and meshes with a gear 10 carried by a short shaft 11 which is provided on its outer end with a hand wheel 12 whereby the shaft 11 may be manually turned to raise or lower the rack and consequently, the shelf 5. The shaft 11 also carries a ratchet wheel 14 and the weight of the rack and attached parts tend to rotate the ratchet wheel 14 in a clockwise direction (Fig. 3). A holding pawl 15 held in engagement with the ratchet wheel 14 by a spring 16 normally prevents the clockwise rotation of the ratchet wheel 14 and consequently through the connected parts restrains the envelope blank shelf from descending. A vertically slidable bar 17 is mounted on the front guideway 7 and is normally urged in an upward direction by the coiled spring 18 which is not quite strong enough to lift the bar. The upper end of the bar 17 carries an adjustable stop 19 which contacts with the upper side at an oscillating finger 20 mounted upon a short shaft 21 carried in the bracket 22. This shaft 21 carries a feeler finger 24 which is adapted to be brought into contact with the topmost envelope blank on the stack A, during each cycle of operation. The inner end of the shaft 21 is provided with an arm 25 which extends inwardly in the same direction as the feeler finger 24. This arm is connected by means of a rod 26 (Fig. 5) with roll arm 27 which carries an anti-friction roll 28 that is held in contact with the irregular surface of the cam 29 mounted on the main shaft 2. The anti-friction roll is urged against the surface of the cam 29 by the weight of the rod 26 and also by a coil spring 30. It will be observed that the downward movement of the roll arm 27 will bring the feeler finger 24 into contact with the topmost envelope blank and when the feeler finger contacts therewith, the downward movement of the rod 26 and the roll arm 27 will be stopped regardless of whether the anti-friction roll 28 is in engagement with the low part of the cam 29 or not. The cam, however, positively raises the feeler finger 24 and positively swings the oscillating finger 20 in an upward direction. It therefore follows that the limit of movement of the oscillating finger 20 in a downward direction is controlled by the feeler finger 24 contacting with the topmost blank on the stack of envelope blanks A, while the upward movement of the oscillating finger 20 is controlled by action of the cam 29 on the roll arm 27 and connected parts. The operating pawl 31 is mounted on the sliding bar 17 and is held in engagement with the ratchet wheel 14 by a spring 32, so that if the downward swing of the feeler finger 24, before it contacts with the topmost blank, is sufficient to carry the operating pawl 31 downwardly the distance of one or more teeth on the ratchet wheel 14, this pawl 31 will catch a tooth on the ratchet wheel 14 and the positive upward swing of the oscillating finger 20 will raise the bar 17 and cause the operating pawl 31 to turn the ratchet wheel 14 and through the shaft 11 and connected parts, will lift the envelope blank table. It is then held by the pawl 15 catching a ratchet tooth on the wheel 14. This action will continue until the downward movement of the feeler finger 24 is not sufficient to carry the operating pawl 31 downwardly the distance of a full tooth on the ratchet wheel 14. This mechanism, therefore, maintains the top blank X on the envelope blank stack A at a predetermined level.

Mucilage applying mechanism.

Referring to Figs. 1, 2, 3, 4, and 7, a cement or mucilage tank 101 is mounted at the right side of the upper frame (Fig. 3) by means of the bracket 102 which is attached to the arch frame 104 and the cement tank carries a pick-up roll 105. A suitable control operated by thumb screws 106 determines the thickness of cement carried by the pick-up roll when the same is rotated by the pinion 103, carried by the pick-up roll shaft 109, and pinion 108 carried by the stub shaft 110, as the stub shaft is rotated through the belt drive 111 from the main shaft 2. The stub shaft 110 carries a hand wheel 112 by means of which the pick-up roll 105 may be rotated as desired.

A carriage comprising sleeves 114 and 115 is slidably mounted on transverse rails 116 and 117 that are carried by adjustable supports 118 mounted on cross arms 119 carried by the arch frame 104. The sleeves 114, 115 support the shaft 120 on which the tube 121 carrying doctor rolls 122 and 124 may rotate and may also slide endwise. The contact ring 125 is also mounted on the tube 121 to slide the tube in one direction at one end of the carriage travel and in the opposite direction at the other end of the carriage travel. The sleeves 114 and 115 of the carriage are connected by links 126 with arched arms 127 (Figs. 3 and 4) that are carried on a side shaft 128. This side shaft 128 is forced in one direction by cam 129 through roll arm 130 and connected links 131, 132, and arm 134 mounted on shaft 128, and is pulled in the other direction by a spring 135 (Fig. 2) operating on the arm 136 connected to roller arm 130. As the cam 129 is driven by a small gear 137 on the main shaft 2 and meshes with the large gear 138, twice the diameter of the small gear, the carriage for the doctor rolls will be moved in one direction when the main shaft 2 makes one revolution and in the opposite direction when the main shaft makes the second revolution. As the shaft 128 (Figs. 3 and 4) turns clockwise to its limit, doctor roll carriage (Fig. 4) approaches pick-up roll 105, and the contact ring 125 strikes the inclined surface of the guide arm 140 carried by the arched frame 104 and slides tube 121 carrying the doctor rolls toward the left side of the carriage (viewed as in Fig. 4) just before the doctor rolls 122, 124 come in contact with the pick-up roll 105. The outer circular portion on the cam 129 (Fig. 2) holds the doctor rolls in contact with the pick-up roll for a sufficient length of time to permit the turning of the pick-up roll to completely coat the doctor rolls with cement or mucilage. As the doctor roll carriage approaches the position farthest from pick-up roll 105, the contact ring 125 engages the inclined face on the guide arm 139, and this moves the tube 121 to the right side of the doctor roll carriage (viewed as in Fig. 4).

A vertically slidable shaft 141 (Figs. 3 and 7) is mounted for vertical movement in the main arch frame 105 and carries on its lower end a cross bar 142 upon which are removably and adjustably mounted applicator members 144 and 145, which together form an applicator head. These members are adapted to be changed for other members when the style or size of envelope blanks are changed. The slidable shaft 141 is adjustably connected to a cross-head 146 which in turn is connected to link 147, pivoted to arm 148 mounted on a stub shaft 149 that carries a crank arm 150. A looped link 151 through which a drive rod 152 may slide is pivoted to crank arm 150. This drive rod 152 carries an adjustable nut and spring 154 which bears on the sleeve of the loop link so that the looped link and rod may form a yieldable connection to forces pulling downward on the drive rod 152. An adjustable sleeve 155 is mounted on the drive rod 152 to contact with the lower end of the sleeve on the looped link 151 to positively raise the link in an upward direction when the drive rod 152 is forced upwardly. The drive rod connects at its lower end with a roll arm 156 which carries an anti-friction roll 157 that bears upon the cam 158 carried on the right hand side (Fig. 3) of the main drive shaft 2. Adjacent a portion of the surface of the cam 158 is a guard rim 159 which forms a partly closed cam member operative upon the anti-friction roll 157 to impose pulling forces on the drive rod 152 over this portion of the cam action.

The under surfaces of the applicator members 144 and 145, when standing in their highest position, are held at a predetermined level by means of the circular outer portion of the cam 158 so that the top of the doctor rolls 122 and 124 will contact with the under surfaces of the applicator members and transfer cement from these doctor rolls to these members as the carriage for the doctor rolls is reciprocated beneath the applicator head. Since the cam 158 which raises and lowers the applicator head, makes two revolutions to one revolution of the cam 129 controlling the movement of the carriage for the doctor rolls, it will be observed that the applicator head descends twice during a complete cycle of movement of the doctor rolls. After the doctor rolls have picked up cement from the pick-up roll 105, the doctor roll carriage moves beneath the applicator members with the doctor rolls in the position determined by the action of the contact ring 125 with the guide arm 140. The cam 158 then brings the applicator head down upon the topmost envelope blank X in the stack of blanks A and stamps or prints cement over the areas 160 and 161 on the topmost blank X. In order to allow for slight variations in the level of the topmost blank, the applicator head is pressed against this topmost blank X by the action of the spring 154. The doctor rolls pause, due to the inner curved surface on the cam 129, while the applicator head descends, and when the applicator head is raised to its uppermost position, the doctor roll carriage is returned toward the pick-up roll 105 with the doctor rolls in the position determined by the action of the contact ring 125 with the guide arm 139, which slides tube 121 toward the front of the machine, (Fig. 4) so that a fresh portion of the doctor rolls now sweeps beneath the applicator members 144 and 145 to apply a full charge of cement to the under surfaces of the applicator members. The applicator head is again brought down and again raised by the operation of the cam 156, thereby making a complete cycle of operations of applying cement to the topmost envelope blank X of the stack A.

*Blank feeding mechanism.*

The envelope blanks in the stack A are definitely positioned (Figs. 3 and 4) by guide posts 201, which contact with the front shoulders 202 on the envelope blank X, and rear guide posts 204, which contact with the rear shoulders 205 on the envelope blank X. These guide posts 201 and 204 are mounted on the bed plate 8 and are provided with slots to permit the guide posts to be adjustably positioned to cooperate with various sizes and types of envelope blanks. The guide posts 201 and 204 being mounted on the bed plate 8 are therefore stationary and position and guide the envelope stack as the shelf 5 is raised from time to time under the control of the feeler finger 24 to maintain the level of the topmost blank X on the stack A within predetermined vertical limits. The tops of the front guide posts 201 are slightly higher than the upper limit of level for the topmost blank X so that it is necessary that the blank be lifted above these posts in order that it may be fed forwardly through the machine.

Figure 10:
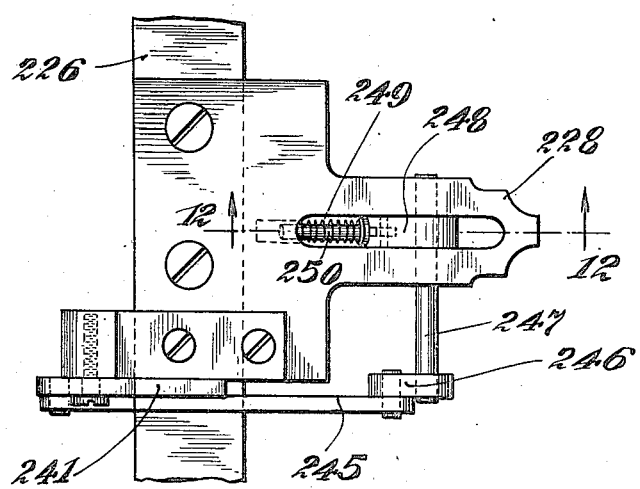
Fig. 10 is a detail plan view of the envelope blank gripper.
Figure 11:
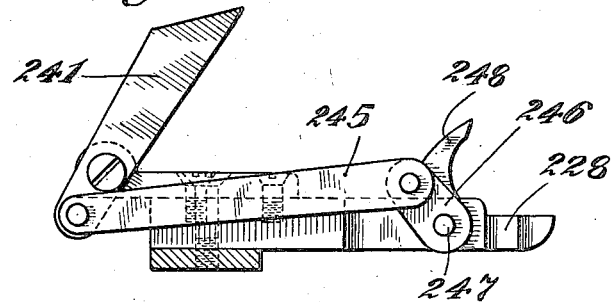
Fig. 11 is an elevational side view of the gripper.
Figure 12:
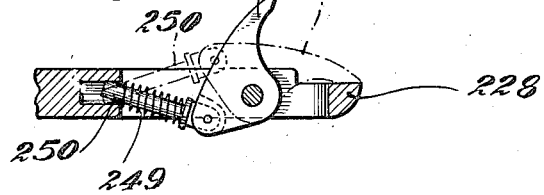
Fig. 12 is a detail sectional view of the gripper taken on line 12—12 of Fig. 10.
Figure 13:
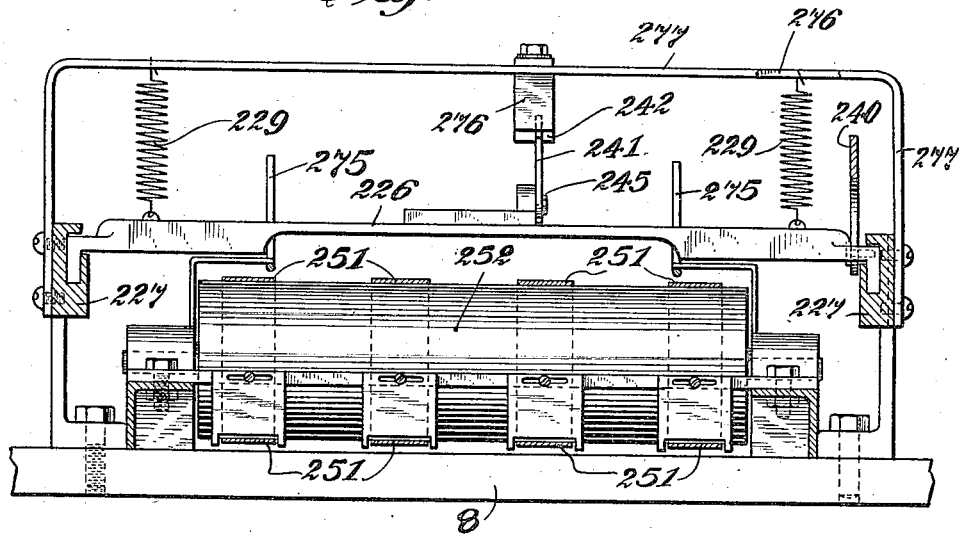
Fig. 13 is a sectional view of the blank feed carriage taken on line 13—13 of Figure 9.
Figure 14:
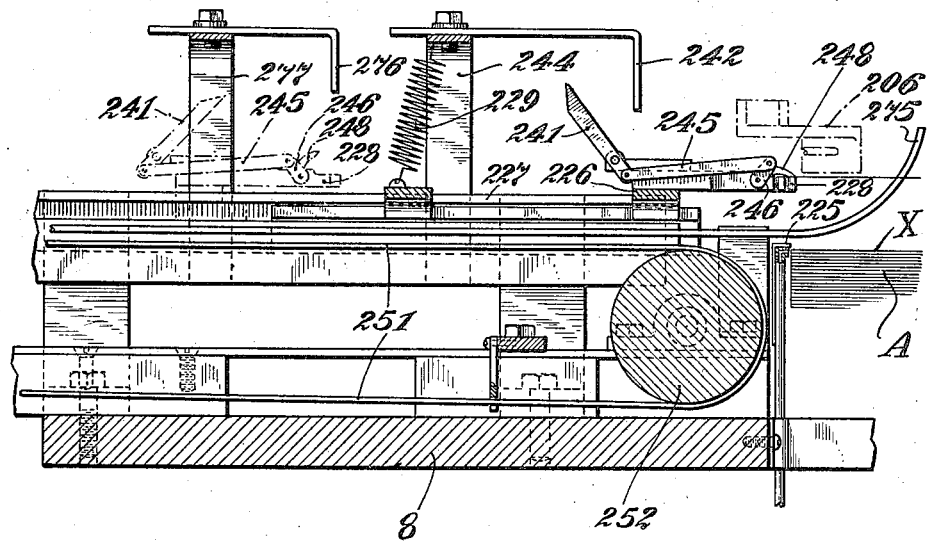
Fig. 14 is a sectional view of the blank feed carriage taken on line 14—14 of Figure 9.

Separated suction boxes 206, 207 (Figs. 3 and 4) are mounted on a cross bar 208 which is carried by vertical rods 209, 210 mounted upon a lower cross bar 211 and slidable through bearings 212 in the bed plate 8. When the cement has been applied to the topmost blank X the suction boxes 206, 207 are brought down against the topmost blank by means of the cam 214 on the main shaft 2, which operates upon roll arm 215 (Fig. 6) to which is connected the vertical link 216, attached to the lever 217, pivoted in the bracket 218, carried by the bed plate 8, and connected at its forward end by link 219 to the lower cross bar 211. Suction on the suction boxes is controlled by cam 220 (Figs. 15, 18, and 21) which operates the valve 221 to open the lines 222 to the suction box and to connect the same with the main suction line 224 (Fig. 15). This action causes the topmost blank to be raised by atmospheric pressure tightly against the under portion of the suction boxes 206, 207. The cam 214 then operates through the connecting link and lever mechanism to raise the suction boxes. This lifts the forward edge of the envelope blank X after the cement has been applied thereto. A light blast of air is directed through the flat nozzle 225 (Figs. 3 and 14) over and downwardly against the topmost blank in the stack A. As soon as the top blank X is raised, a film or flow of air is therefore directed beneath this lifted blank X to float the same from the stack A. When the blank X is lifted and floated entirely free from the stack, a gripper carriage 226 mounted upon rails 227 to slide lengthwise of the machine, is moved toward the lifted blank until the anvil 228, mounted on the gripper carriage, (Figs. 10, 11 and 12) extends beneath the raised blank. The forward movement of the gripper carriage is helped by springs 229 but is really brought about by the arm 230 (Figs. 1 and 2) mounted loosely on shaft 231 carried by the main frame, being oscillated by cam 232 mounted on the main shaft 2. This cam operates an anti-friction roller 234 on the forward end of the lever 235 which is held against the cam 232 by the spring 236 and also spring 237 acting on the arm 230. The rear end of the lever 235 is slotted and connects with a crank arm 238 on the shaft 231 by means of a slotted adjustable link 239. By moving the lower end of the link 239 in the slot in the lever 235, the throw of the arm 230 may be regulated and by adjusting the length of the link 239, the zone of action of the upper end of the arm 230 and the gripper carriage 227 which is connected to the arm 230 by means of link 240 is predetermined.

As the gripper carriage 227 moves forward to position the anvil 228 beneath the raised blank the trigger 241 (Figs. 2, 9, and 14) contacts with the front operating stop 242 which is adjustably mounted on an arched bar 244 carried by the main frame. The continued forward movement of the gripper carriage 227 causes contact between the stop 242 and the trigger 241 to push on the link 245 (Figs. 10, 11, and 14) which is connected with the crank 246 on the gripper shaft 247 mounted in the anvil 229. The gripper shaft 247 carries a gripper finger 248. This gripper finger is provided with an overthrow spring 249 mounted on the guide pin 250 that is pivoted to the gripper finger 248. As the trigger 241 continues to be pulled backwardly at its upper end by its contact with the stop 242 during the forward movement of the carriage the continued movement causes a turning of the gripper shaft until the overthrow spring 249 is effective to snap the gripper finger 248 downwardly toward the anvil. Since the anvil 229 is beneath the raised envelope blank X, (Fig. 14), the gripper finger 248 clamps this blank X tightly against the anvil 229. The suction cam 220 now operates valve 221 to cut off suction and open the line to atmosphere. The cam 232 then operates to cause the gripper carriage to move toward the rear of the machine, to the dotted line position shown in Fig. 9, thereby enabling the gripper finger 248 and anvil to drag the blank X from over the stack A onto the travelling tapes 251 which are mounted upon the front idler roller 252 and the rear drive roller 254 (Figs. 2 and 15), and are driven in such manner that the upper run of the tapes 251 moves toward the rear of the machine.

This travel is brought about by means of the sprocket and chain drive (Fig. 2) whereby the sprocket 255 mounted on the shaft 256 is connected by drive chain 257 with sprocket 258 on shaft 259. This shaft is geared to shaft 260 by gears 261 and 262 in order to reverse the direction of rotation to secure the proper direction of travel for the tapes 251. A sprocket 264 on shaft 260 is connected by drive chain 265 with sprocket 266 on the main cam shaft 267 which in turn carries sprocket 268 that is connected by drive chain 269 with the sprocket 270 on the main shaft 2. The travelling tapes 251 pass over tighteners 271, 272, and 274 respectively, which are adjustable to take up the slack in the four travelling tapes.

As the gripper carriage 227 continues to move toward the rear of the machine, the shoulders 202 on the blank X are drawn beneath the guides 275 (Figs. 9 and 14) and the trigger 240 contacts with the rear operating stop 276, carried upon another arched bar 277 supported by the main frame. The continued rearward movement of the carriage 227 acts on the trigger 241 to cause movement of the gripper finger to release the envelope blank X and cause the overthrow spring 249 to snap the gripper finger full open. This rear operating stop 276 is slightly less in length than the front operating stop 242 so that after the trigger 241 has snapped the gripper finger 248 full open the top of the trigger 241 has swung forward sufficiently so that as the gripper carriage again moves forwardly on its next trip the trigger 241 will pass beneath the lower end of the rear operating stop 276 and will contact with the front operating stop 242 to cause the gripper finger to be snapped into gripping position as previously described.

When the blank X is released by the gripper finger it drops upon the travelling tapes 251 and is carried toward the rear of the machine.

*Blank positioning mechanism.*

The wet gummed or cement spotted blank X is carried toward the rear of the machine by the travelling tapes 251 until it is registered and positioned over the assembly table 301 (Figs. 1 and 2) where the blank is stopped by a pair of positioning pins 302 and 304 which contact with the forward shoulders 202 on the blank X, thereby stopping the forward movement of the blank and permitting the travelling tapes 251 to slide thereunder in suitable grooves provided in the assembly table 301. The positioning pins 302 and 304 are carried by forwardly extending arms 305 and 306 which are mounted on a small shaft 307 which may oscillate in bearings on the main frame. A crank arm 308 extends forwardly from the middle of the shaft 307 and is connected by a vertically extending link with a roll arm 309. An anti-friction roll 310 thereon is held in contact with a cam 311 (Figs. 2, 15 and 20) by means of a spring 312. Shortly after the cam 311 is operative to raise the positioning pins 302 and 304 above the assembly table 301, a cam 314 (Figs. 15, 19 and 21) opens a valve 315 to permit suction from the main suction line 224 to be effective through the valve 315 to four small openings 316 (Fig. 1) in the assembly table to tightly hold the blank X in position over the assembly table where it has been accurately registered by the positioning pins 302 and 304.

*Liner support.*

The liners are supported in a stack B at the right of the machine, looking from the front thereof, opposite the assembly table 301. The stack B of the liners (Figs. 1, 15 and 16) is supported upon the shelf 401 and is held in position by liner stack guides 402 that are stationary and carried by the main frame, but are adjustable to fit various shapes and sizes of liners. The liner shelf is mounted on a vertically movable bracket 404 which slides in guideways 405. The back of the bracket is provided with a rack 406 (dotted lines, Fig. 1) which meshes with a gear 407 (dotted lines Fig. 1) on the shaft 408. This shaft carries on one end a hand wheel 409, and on the other end a ratchet wheel 410. This ratchet wheel 410 (Fig. 16) is restrained from movement in a direction that would permit the rack to go downward by means of a holding pawl 411. A vertically slidable bar 412 is mounted adjacent the ratchet wheel 410 and carries an operating pawl 414 which is spring pressed against the ratchet wheel 410. The upper end of the slidable bar 412 is provided with actuation stops 415, 416, between which an actuating finger 417 mounted upon an oscillatory shaft 418 is adapted to oscillate. One end of the shaft 418 is connected by crank 419 and link 420 with an oscillating lever 421 which carries an anti-friction roll 422 that is held against the cam 424 mounted upon the main cam shaft 267.

The end of the shaft 418 opposite the crank 419 is provided with an arm 425 which is connected by a link 426 with an oscillatory shaft 427 that carries a pressure pad 428 adapted to contact with the topmost liner Y on the stack of liners B. As the cam shaft 267 rotates, the cam 424 operates to oscillate the lever 421 against the action of the spring 429 and to move upward the vertical slide bar 412 and to lift the pressure pad 428. The spring 429 then acts to lift the free end of lever 421, as a cam 419 continues to turn, moves the slidable bar 412 downward. The movement of the slidable bar downward is limited by the contacting of the pressure pad 428 with the topmost liner Y in the stack of liners B. It therefore will be seen that the downward movement of the actuating pawl 414 is under control of the height of the stack of liners. When the stack of liners is lowered by taking away liners from the top until the movement of the pressure pad 428 in its swing is sufficient to permit the operating pawl 414 to drop over a tooth on the ratchet wheel 410 then the ratchet wheel will be turned one tooth and the stack of liners will be lifted. This operation will continue during the running of the machine until the topmost liner Y, limits the movement of the pressure pad 428 to such an extent that the operating pawl 414 does not move down a full tooth or more on the ratchet wheel 410. Therefore, it will appear that the upward feed of the stack of liners is controlled by the level of the topmost liner Y.

*Liner carrier roll and assembly mechanism.*

A pair of guide rails 501 are mounted transversely of the machine near the rear thereof (Figs. 1, 2, and 15) and comprise the support for carriage slides 502, 504, which carry the liner carrier roller 505. The carriage slides 502, 504, are respectively connected by links 506, 507, with operating arms 508, 509, mounted on an arm shaft 510 which oscillates in bearings 511, 512, carried by the main frame. A crank arm 514 extends from substantially the main portion of the arm shaft 510 and is connected by link 515 (Fig. 2) with another crank arm 516 carried by the cross shaft 231 on which the gripper carriage arm 230 was loosely mounted. This cross-shaft (Figs. 1 and 8) carries at the left of the machine, as viewed from the front, a crank arm 517 connected by an adjustable pitman 518 to a cam 519, on the main shaft 2. A spring 520 also connected to a crank arm 521 on the shaft 231 forces an anti-friction roll 522 against the face of the cam 519. This cam 519 is located adjacent a fly wheel 524 on the main shaft. It will be observed that as the main shaft rotates, the cam 519 together with the several shafts, links, etc., causes the carriage slides 502 and 504 to slide on the guide rails 501. A horizontally extending rack 525 is mounted on the main frame and extends parallel to the rails 501. A wide gear 526 is carried by the carriage slide 504 and is in engagement with the rack 525. A second gear 527, secured to the shaft of the liner carrier roller 505, is in mesh with the wide gear 526. It will be observed that as the carriage slides 502, 504, are caused to move transversely across the machine, the rack 525 operating on the wide gear 526 which connects with the second gear 527 causes the liner carrier roller 505 to rotate.

The liner carrier roller shaft 528 is tubular at one end and connects with a flexible conduit 529 which leads to valve 530 connected to the main suction line 224. This valve 530 is controlled by cam 531 (Figs. 17 and 21) on the main cam shaft 267. Openings 532 lead from the hollow portion of the shaft 528 to the surface of the roller 505. The roller 505 is provided with cut away portions 534, to provide clearance spaces for the liner stack guides 402 and the positioning pins 302 and 304.

Figure 1:
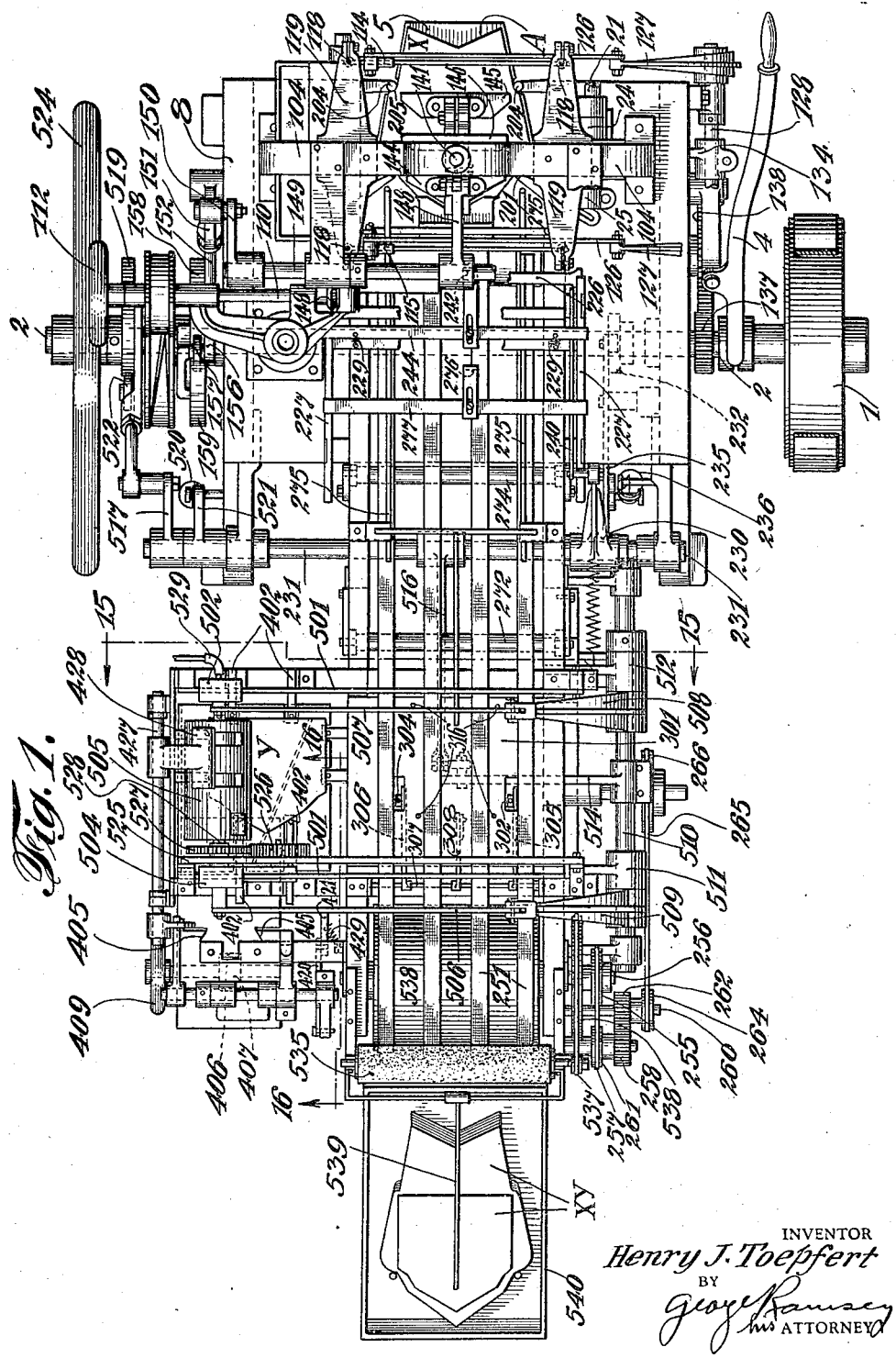
Fig. 1 is a plan view of the machine.
Figure 2:
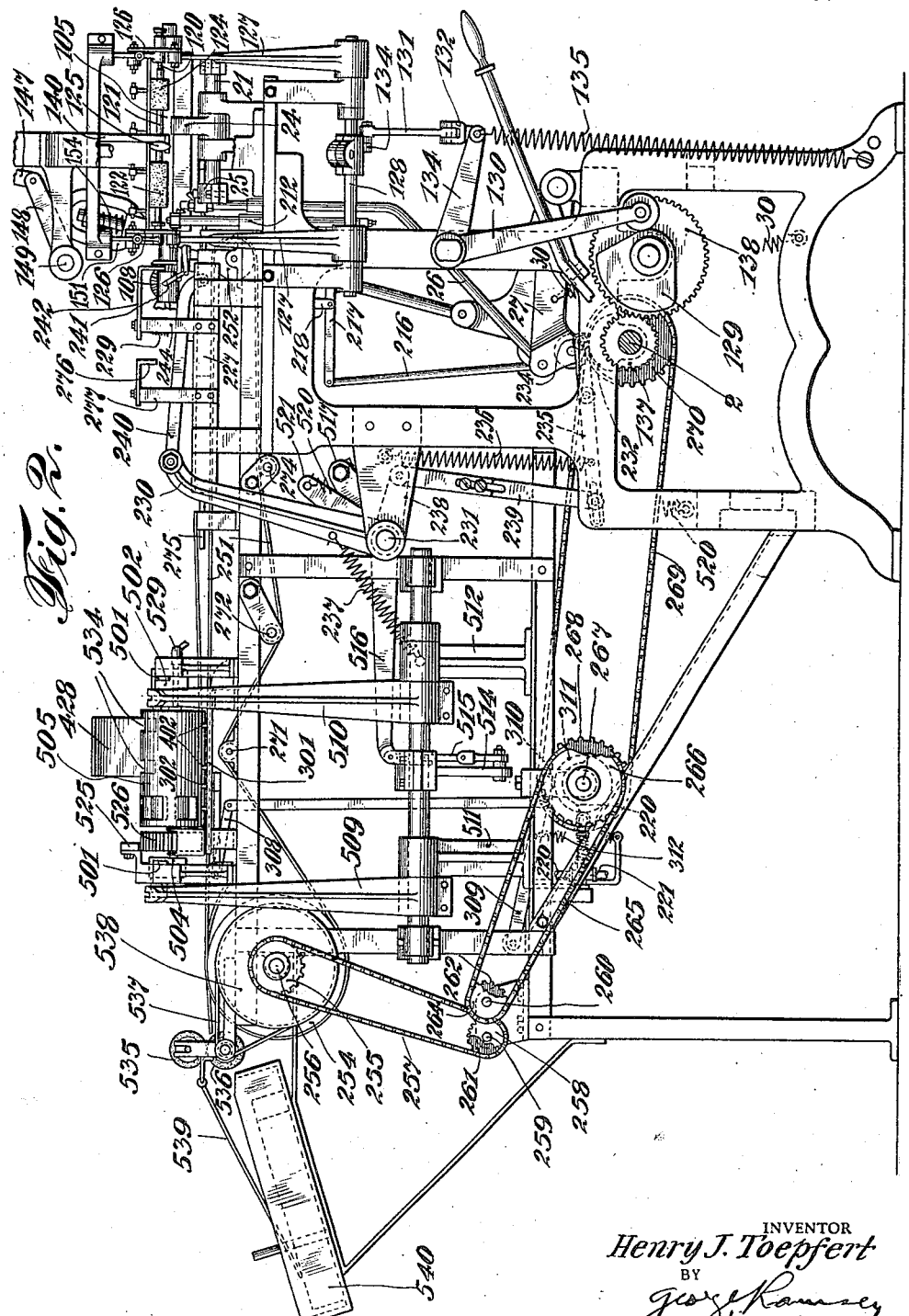
Fig. 2 is a side elevation of the machine with the driving mechanism removed.

When the liner carrier roller 505 is moved over the stack B of liners, the suction control cam 531 is rendered operative to open the suction line so that suction becomes effective through the openings 532 which are now positioned directly over the outer edge of the topmost liner Y on the stack of liners B as shown in Figs. 1 and 15. This suction is effective to cause the topmost liner Y to be firmly pressed at its outer edge against the carrier roll 505. In the meantime, an envelope blank with the gummed or cemented spots thereon has been positioned over the assembly table. The cam 519 now causes the operating arms 508 and 509 to cause the carriage slides 502, 504, to move toward the assembly table. During this movement, the rack 525 and gears 526 and 527 cause the liner carrier roller 505 to turn in such manner that the roller 505 rolls over the top liner blank, and wraps the same around the roller and continues its movement until it brings the liner Y with the face of the liner up and directly in position over the envelope blank that is being held on the assembly table. As soon as the carrier roller 505 has positioned the initially contacting edge of the liner Y accurately upon the blank X, the cam 531 operates to close the valve 530 and open the line to atmosphere, thereby relieving suction on the roller 505. This releases the blank from the carrier roller 505, which roller proceeds to roll down the liner upon the cement spots on the blank X. The carriage slides 502, 504, continue their movement toward the left of the machine, as viewed from the front, until the liner carrier roller 505 has passed entirely beyond the assembly table 301 and has left the liner cemented to the blank. Cam 311 now operates to lower the positioning pins 302 and 305 and cam 314 operates to cut off suction from the four small openings 316 in the assembly table 301, and to open the line to these openings to atmosphere so that the envelope blank X with the liner Y cemented thereto is now free to be carried forward by the traveling tapes 251, since the friction of these tapes is now greater than any interference tending to stop the movement of the assembled unit. The assembled unit X—Y therefore is carried forward by the tapes and delivered to the squeegee rolls 535, and 536 (Figs. 1 and 2) which are mounted at the rear of the machine. The lower squeegee roll 536 is power driven by a belt 537 running from a pulley 538 on the drive roll shaft 256. The surface speed of the squeegee rolls is a higher rate of speed than the traveling tapes, and this causes the assembled blank and liner to be quickly drawn through the squeegee rolls which press the liner and blank tightly together and delivers the assembled unit XY beneath to hold down wire 539 into the delivery box 540 mounted at the rear of the machine or the assembled unit may be delivered directly to an envelope forming machine.

Operation.

The operation of the machine, leaving out many of the mechanical details is as follows. A stack of envelopes A is placed on the shelf 5 and the hand wheel 12 is turned to cause the connecting mechanism to raise the shelf and the stack thereon until the uppermost blank X is slightly beneath the flat nozzle 225. The stack of liners B is positioned on the liner shelf 405 with the liner carrier roller 505 over the stack and the hand wheel 409 is operated to raise the stack until the topmost liner Y is against the liner carrier roller 505. The machine is thrown into operation by means of the clutch mechanism 4 and the rotation of the main shaft 2 through connected mechanisms causes the doctor rolls 122, 124 to remain in contact with the pickup roll 105 until the doctor rolls are thoroughly covered with mucilage or cement, at which time the doctor rolls are carried across the machine and come into contact with the under faces of the applicator members 144, 145 to transfer mucilage or cement thereto. The applicator head then descends and stamps the top envelope blank X with cement areas 160 and 161, which are arranged relative to the shape of the liner in such manner as to best cement the liner thereto. The applicator head rises and the topmost blank X is lifted by the suction boxes 206, 207, while a jet of air is delivered under the blank X by a flat nozzle 225. The gripper carriage 227 moves forward and a gripper finger moves between the suction boxes 206, 207 with the anvil 229 beneath the sheet and the gripper finger 248 above the blank X. The finger tripping mechanism operates to cause the finger to quickly clamp the blank X. Suction is released from the suction boxes, and then the gripper carriage 227 pulls the blank into the machine and drops it upon the traveling tapes 251 which quickly carry it to the assembly table 301, where it is definitely positioned by the positioning pins 302, 304, which have been raised to intercept the blank. Suction then becomes effective through the small openings 316 in the assembly table to tightly press the blank upon the assembly table.

The liner carrier roller 505 draws the far edge of the liner tightly against the roller by suction which is effective through the openings 532 in the roller and then the roller travels across the machine taking the liner with it, and registers the liner Y exactly over the cement spots on the blank X with the decorative face of the liner up and with the face of the blank X being against the assembly table. As soon as the leading edge of the liner has contacted with the blank, suction is released from the liner carrier-roller 505 and this roller now proceeds to act as a squeegee roller to roll the liner down upon the blank and form an intimate contact between the blank and the liner.

After the registering and assembling operation are completed by the carrier roller 505, the positioning pins 302, 304, are removed and suction is released from the four small openings 316 in the assembly table so that the traveling tapes 250 are now free to carry the assembled blank and liner to the squeegee rolls 535, 536, at the end of the machine which rolls down the liner on the blank at right angles to the direction of movement of the roller 505 which rolled down the liner on the blank. The squeegee rolls form the final pressure members to complete the cementing operation. It will be noted that the rolling of the liner carrier roller is transverse the blank and liner, whereas the rolling of the squeegee rolls is longitudinal to the blank and liner so that the effect of these two rolling operations is to smooth out all wrinkles or variations between the blank and the liner, thereby flattening the liner on the blank and delivering the assembled unit XY to the delivery box 540 in a perfectly flat and tightly cemented condition.

Method.

The present invention includes methods of assembling sheet blanks and more especially of assembling an envelope liner to an envelope blank, one of which methods comprises the applying of cement to one of the blanks, for example, to the envelope blank as above described, and then registering a second blank on one edge relatively to the first blank and progressively applying the second blank to the first blank. This operation as above illustrated is conveniently carried out by means of the blank carrier roller 505 which wraps the liner blank Y around the roller as the roller turns, and brings the leading edge of the liner blank Y to a predetermined position relative to the envelope blank X. Then as the roller 505 travels across the envelope blank, it progressively applies pressure to the liner and lays the liner Y smoothly over the cemented areas on the envelope blank X.

Another method disclosed herewith is that of treating the united blanks by applying progressive pressure thereto in paths which are angularly disposed one to another, and as above illustrated are preferably at right angles to each other. It will be observed that the carrier roller 505 travels across the liner Y and blank X in applying the liner to the blank and then the squeegee rolls 535, 536, apply pressure longitudinally of the unit or at right angles to the pressure applied by the carrier roller 505. This method of applying the pressure to the united blanks straightens out the blanks one to another in both directions and obviates crinkles or looseness between the two cemented sheets.

The continuous cement line or area 160 (Fig. 4) cements the leading edge of the liner Y to the blank X and the three spotted areas 161 cement the rear edge of the liner to the blank. It will be observed that the cement covered area at the leading edge is greatly in excess of the total cement covered area at the rear edge. This permits the uniting of the front edge to act as an anchor so that when the assembled unit runs through the squeegee rolls, which firmly units the leading edge of the liner with the envelope blank, any excess length between the leading edge cemented portion and the rear edge about to be cemented may slip somewhat over the cement spots at the rear edge until the blank and liner are exactly the same length between the front cemented portion and the rear cemented part. Therefore, the present invention includes the method of securing liners to envelope blanks by providing a cemented area for the leading or flat edge of the blank which is in excess of the cemented area at the other or lower edge thereof.

It will also be observed that the lower squeegee roll 536 is the driven roll and the upper squeegee roll 535 is an idler roll. This construction permits the envelope blank, which is in contact with the driven roll, to act as a carrier which drives the assembled unit between the squeegee rolls. Since the upper roll 535 is an idler and merely turns with the travel of the blank, it therefore follows there is no tendency of these rolls to cause the leading edge of the liner to slide on the envelope blank, but there is a tendency of these rolls to gather up or accumulate any looseness between the blank and the liner, which looseness is taken up by sliding the liner over the rear edge cement spots on the blank.

The above methods are valuable improvements in the art in that they result in producing an assembled unit wherein the blank X and liner Y lie very flat together and are attached only at their extreme edges. This greatly facilitates the use of these blanks in an automatic envelope forming machine.

Having described my invention, I claim:—

1. In a machine for assembling sheet blanks, the combination of cement applying devices, means to move a sheet blank to an assembly station, devices comprising a suction roller to position a second sheet blank upon the first mentioned blank, and pressure rolls to apply pressure to said blanks.

2. A machine for assembling sheet blanks comprising means for individually feeding a blank from a stack of blanks to an assembly station, devices to accurately position said blank at said assembly station, pneumatic means to hold said blank flat at said station, mechanism to feed a second blank from a stack of second blanks and position said second blank accurately upon the first mentioned blank.

3. A machine for assembling sheet blanks comprising means for individually feeding a blank of flexible paper from a stack of blanks to an assembly station, devices to accurately position said blank in a stationary position at said assembly station, mechanism comprising a suction roller to feed a second blank from a stack of second blanks and position said second blank accurately upon the first mentioned stationary blank.

4. A machine for assembling sheet blanks comprising mechanism for feeding a blank of flexible paper from a stack of blanks to an assembly station, devices to position said blank in a predetermined stationary position at said assembly station, means to feed a second blank from a stack of blanks and to register said second blank over the first mentioned stationary blank at the assembly station by registering one edge of the second blank upon the first mentioned blank and then progressively applying the second blank to the first mentioned blank.

5. A machine for assembling sheet blanks comprising means to apply cement over predetermined areas on one of said blanks, mechanism to position a portion of a second mentioned blank over a portion of the cement covered area and to progressively apply pressure from said portion over the remainder of said second mentioned blank to cause the cement to unite said blanks, and devices to again progressively apply pressure to the united blanks in a path at right angles to the first application of pressure.

6. A machine for assembling sheet blanks comprising means to support a stack of blanks in an accurate predetermined position, cement applying devices adapted to apply cement to predetermined areas of one of said blanks, means to position a second blank over said areas by progressively applying pressure over said second blank in a transverse direction to unite said blanks, and means to apply pressure to said united blanks in a longitudinal direction.

7. A machine for assembling envelope blanks and liners, comprising means to progressively apply a liner across an envelope blank, and devices to progressively apply pressure to the assembled blank and liner in a direction lengthwise of the blank.

8. In a machine for assembling envelope blanks and liners, means comprising a roller to progressively apply a liner across an envelope blank, and devices to progressively apply pressure to the assembled blank and liner in a direction lengthwise of the blank.

9. A machine for assembling envelope blanks and liners, comprising means to progressively apply a liner across an envelope blank, and roll devices to progressively apply rolling pressure to the assembled blank and liner in a direction lengthwise of the blank.

10. In a machine for applying liners to envelope blanks, the combination of means for applying cement over a continuous area relative to the flap portion of an envelope blank and over separated areas where the rear edge of the liner is to be applied; means to apply the liner to the blank over said cement covered areas; and mechanism to apply pressure progressively from the flap portion of the blank and liner to the rear edge thereof.

11. In a machine for applying liners to envelope blanks, the combination of means for applying cement over a continuous area relative to the flap portion of an envelope blank and over separated areas where the rear edge of the liner is to be applied; means to apply the liner to the blank over said cement covered areas; and mechanism to apply pressure to the assembled liner and blank.

12. A machine for applying liners to envelope blanks comprising cement applying mechanism adapted to apply cement over a predetermined area on an envelope blank, means to lift said cemented blank from a stack of blanks, means to feed said blank to an assembly station, devices to hold said blank at said station in a predetermined position, means to feed a liner over said blank being held at said assembly station, and pressure devices to apply pressure to cement said liner to said blank.

13. A machine for applying liners to envelope blanks comprising cement applying mechanism adapted to apply cement over a predetermined area on an envelope blank, suction means to lift said cemented blank from a stack of blanks, means to feed said blank to an assembly station, positioning pins to hold said blank at said station in a predetermined position, means to feed a liner over said blank being held at said assembly station, and pressure devices to apply pressure to cement said liner to said blank.

14. A machine for applying liners to envelope blanks comprising cement applying mechanism adapted to apply cement over a predetermined area on an envelope blank, means to lift said cemented blank from a stack of blanks, means to feed said blank to an assembly station, devices to hold said blank at said station in a predetermined position, a suction roller to roll a liner over said blank being held at said assembly station, and pressure devices to apply pressure to cement said liner to said blank.

15. A machine for applying liners to envelope blanks comprising blank supporting means adapted to maintain the topmost blank on a stack of envelope blanks at a substantially predetermined level, a vertical reciprocatory cement applicator mounted over the stack of blanks, traveling tapes adjacent said stack of blanks, sheet feeding mechanism adapted to feed a sheet from said stack after said cement applicator has applied cement to said blank and to deposit said sheet upon said traveling tapes, an assembly table to which said tapes convey said blank, means to position the blank at the assembly table, means to feed a liner to said positioned blank, and means to apply pressure to cement said liner and blank together.

16. A machine for applying liners to envelope blanks comprising blank supporting means adapted to maintain the topmost blank on a stack of envelope blanks at a substantially predetermined level, a vertical reciprocatory cement applicator mounted over the stack of blanks, traveling tapes adjacent said stack of blanks, a reciprocatory gripper finger adapted to feed a sheet from said stack after said cement applicator has applied cement to said blank and to deposit said sheet upon said traveling tapes, an assembly table to which said tapes convey said blank, positioning pins to position the blank at the assembly table, means to feed a liner to said positioned blank, and means to apply pressure to cement said liner and blank together.

17. A machine for applying liners to envelope blanks comprising means to feed an envelope blank toward an assembly table, positioning pins adapted to be raised into the path of said blank and to stop the same in a predetermined relation over said table, pneumatic means to secure said blank in position over said table, and a suction roller movable over said table and adapted to carry a liner and apply the same to said blank.

18. In a machine for applying liners to envelope blanks, liner applying mechanism comprising a rotatable suction roller adapted to pick up a liner at a supply station, and means to move the roller sidewise from the supply station to an assembly station and place said liner upon an envelope blank at the assembly station.

19. In a machine for applying liners to envelope blanks, liner applying mechanism comprising a rotatable suction roller adapted to pick up and carry a liner from a supply station to an assembly station and place said liner upon an envelope blank at the assembly station, devices to render suction effective on said roller when over the supply station and to cut off suction after said roller has passed to the assembly station, and means to operate said roller between said stations.

20. In an envelope liner machine, a liner applying mechanism comprising a track, a carriage slidable upon said track, means to slide said carriage upon said track, a liner carrying roller carried by said carriage, and means to cause said roller to rotate when said carriage is reciprocated between a liner supply station and an assembly station where said liner is adapted to be superimposed upon an envelope blank.

21. In an envelope liner machine, a liner applying mechanism comprising a track, a carriage slidable upon said track, means to slide said carriage upon said track, a suction liner carrying roller carried by said carriage, devices to render suction effective on said roller when over the supply station and to cut off suction after said roller has passed to the assembly station, and means to cause said roller to rotate when said carriage is reciprocated between a liner supply station and an assembly station where said liner is adapted to be superimposed upon an envelope blank.

22. In an envelope lining machine, a liner carrying mechanism comprising a pair of substantially parallel tracks, a carriage slidable on said tracks, means to slide said carriage on said tracks, a suction roller carried by said carriage and provided with suction openings adapted to be brought over an edge of a liner when said suction roller is at the limit of its travel over a stack of liners at a supply station, means to render suction effective through said openings to pick up and hold a portion of the topmost liner against said roller, means to rotate said roller as the carriage is moved to an assembly station where said suction is cut off to release said liner from said roller over the assembly station.

23. In an envelope lining machine, means to apply cement to an envelope blank, devices to feed said blank to an assembly station, a liner carrying mechanism comprising a pair of substantially parallel tracks, a carriage slidable on said tracks, means to slide said carriage on said tracks, a suction roller carried by said carriage and provided with suction openings adapted to be brought over an edge of a liner when said suction roller is at the limit of its travel over a stack of liners at a supply station, means to render suction effective through said openings to pick up and hold a portion of the topmost liner against said roller, means to rotate said roller as the carriage is moved to said assembly station where said suction is cut off to release said liner from said roller and apply the liner to the blank at the assembly station.

24. In an envelope lining machine, the combination of a receptacle adapted to hold a supply of cement, a pick-up roll mounted to dip into cement in said receptacle, doctor rolls adapted to receive cement from said pick-up roll, an applicator head, means to reciprocate said doctor rolls beneath said applicator head to transfer cement from said doctor rolls to said applicator head, and devices to change the path of movement of the doctor rolls beneath the applicator head.

25. In an envelope lining machine, cement applying mechanism comprising a receptacle to hold a bath of cement, a pick-up roll rotatably mounted in said bath, a carriage, doctor rolls mounted in a carriage, means to reciprocate said carriage and cause the same to pause with the doctor rolls in contact with the pick-up roll to transfer cement from the pick up roll to the doctor rolls, an applicator head arranged above the path of the doctor rolls in such manner that the doctor rolls contact therewith as the carriage is reciprocated, means to cause the doctor rolls to travel one path during movement of the roller carriage in one direction and to travel a different path during the movement of the carriage in the other direction, and means to cause the applicator head to transfer cement to an envelope blank after each passage of the doctor rolls beneath said head.

26. In an envelope lining machine, cement applying mechanism comprising a receptacle to hold a bath of cement, a pick-up roll rotatably mounted in said bath, a carriage, doctor rolls mounted in a carriage, means to reciprocate said carriage and cause the same to pause with the doctor rolls in contact with the pick-up roll to transfer cement from the pick-up roll to the doctor rolls, an applicator head arranged above the path of the doctor rolls in such manner that the doctor rolls contact therewith as the carriage is reciprocated, means to cause the doctor rolls to travel one path during movement of the roller carriage in one direction and to travel a different path during the movement of the carriage in the other direction, means to feed a liner member and an envelope blank member to an assembly station, and means to cause the applicator head to transfer cement to one of said members after each passage of the doctor rolls beneath said head.

27. In a machine of the class described, a cement applicator head operable to engage a blank to imprint cement over predetermined areas thereon, means to hold a supply of cement, reciprocatory means to transfer cement from said holding means to said applicator head, and mechanism for operating said reciprocatory means to cause the same to have one cycle of operation to two cycles of operation of the applicator head.

28. In a machine of the class described, a cement applicator head operable to engage a blank to imprint cement over predetermined areas thereon, means to hold a supply of cement, reciprocatory means comprising transfer rolls to transfer cement from said holding means to said applicator head, mechanism for operating said reciprocatory means to cause the same to have one cycle of operation to two cycles of operation of the applicator head, and devices to change the path of said rolls for each cycle of operation of said head.

29. The method of applying one paper blank to another which comprises applying cement to a predetermined area of one of said blanks, positioning the other of said blanks over said cement covered area, applying pressure progressively transversely of said blanks, and applying subsequent pressure progressively lengthwise of said superimposed blanks.

30. The method of assembling primary and secondary paper blanks comprising coating a predetermined area of one of said blanks with cement, positioning the other of said blanks over the cement coated area by registering a portion of the blank being applied to the primary blank and then rolling the secondary blank in position on the primary blank, and then progressively applying pressure in a direction angularly disposed to that by which the secondary blank was applied to the primary blank.

31. The method of applying liners to envelope blanks which comprises coating a predetermined area of one of said blanks with a line of cement corresponding to the shape of the flap edge of the liner, applying the liner over the envelope blank by causing said liner to initially contact at one edge at substantially right angles to the line of cement and then rolling the liner over the line of cement.

32. The method of applying liner blanks to envelope blanks comprising coating the envelope blank over predetermined areas with cement, applying the liner blank over said cement areas and progressively applying pressure to said assembly blanks to unite one blank to the other, and applying pressure progressively a second time in a direction angularly disposed to the direction the first pressure was applied.

33. The method of applying liners to envelope blanks, which method comprises applying cement over an area on the envelope blank, corresponding to the outline of the flap edge of the liners, wrapping a liner blank around a roller, positioning the leading edge of said liner blank over one end of said cement covered outline, releasing the liner blank from the roller and rolling the liner blank into position upon said envelope blank.

34. The method of attaching envelope liners to envelope blanks comprising applying cement over predetermined areas on said envelope blank, progressively rolling said liner into position over said blank, and then progressively squeezing said liner and blank together with the progressive pressure being at right angles to the progressive line of contact when said liner was rolled upon said blank.

35. The method of assembling envelope blanks and liners comprising providing a substantially continuous line of cement over the area of contact between the flap edge of the liner and the flap edge of the blank, placing the blank and liner together, and progressively applying pressure from the tip of the flap of the envelope blank and liner toward the rear edge thereof.

36. The method of applying liners to envelope blanks comprising coating an area of envelope blanks with a substantially continuous line of cement having the conformation of the leading edge of the liner, and coating spots on the envelope blank adapted to contact with the rear edge of the liner, applying a liner to said blank by a line of pressure moved progressively crosswise of the liner, and then subjecting the assembled unit to final pressure moving progressively lengthwise of the unit.

37. The method of assembling envelope blanks and liners comprising providing cement between the liner and the blank, placing the blank and liner together, progressively applying pressure in one direction over the blank and the liner and progressively applying subsequent pressure to the blank and liner in another direction angularly disposed to the direction of application of the first mentioned pressure.

HENRY JOSEPH TOEPFERT.